(12) United States Patent
Riggert et al.

(10) Patent No.: US 11,925,185 B2
(45) Date of Patent: Mar. 12, 2024

(54) APPARATUS AND METHOD FOR CUTTING INTO BREAST FILLETS THAT ARE CONNECTED TO ONE ANOTHER AT LEAST IN THE REGION OF A BREASTBONE OF A CARCASS OF POULTRY BODIES OR PARTS THEREOF, WHEREIN THE BREAST FILLETS ARE CUT ALONG THE BREASTBONE

(71) Applicant: Nordischer Maschinenbau Rud. Baader GmbH + Co. KG, Lübeck (DE)

(72) Inventors: Lasse Riggert, Lübeck (DE); Valentin Fischer, Lübeck (DE); Andreas Landt, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 255 days.

(21) Appl. No.: 17/624,446

(22) PCT Filed: Jun. 23, 2020

(86) PCT No.: PCT/EP2020/067496
§ 371 (c)(1),
(2) Date: Jan. 3, 2022

(87) PCT Pub. No.: WO2021/004778
PCT Pub. Date: Jan. 14, 2021

(65) Prior Publication Data
US 2022/0354139 A1 Nov. 10, 2022

(30) Foreign Application Priority Data
Jul. 5, 2019 (DE) .......................... 102019118268.9

(51) Int. Cl.
*A22C 21/00* (2006.01)

(52) U.S. Cl.
CPC ........ *A22C 21/003* (2013.01); *A22C 21/0053* (2013.01)

(58) Field of Classification Search
CPC .............. A22C 21/003; A22C 21/0053; A22C 21/0023
(Continued)

(56) References Cited

U.S. PATENT DOCUMENTS 4,424,608 A * 1/1984 Martin ............... A22C 21/0023
452/169
5,466,185 A * 11/1995 Martin ............... A22C 21/0069
452/165

(Continued)

FOREIGN PATENT DOCUMENTS

CA 12806223 A1 8/2013
CN 103355396 A 10/2013
(Continued)

OTHER PUBLICATIONS

International Search Report dated Sep. 30, 2020, International Application PCT/EP2020/067496.

*Primary Examiner* — Richard T Price, Jr.
(74) *Attorney, Agent, or Firm* — DINSMORE & SHOHL LLP

(57) ABSTRACT

An apparatus is for cutting into breast fillets that are connected to one another of a carcass of poultry bodies, the breast fillets being cut into along the breastbone. The apparatus includes a transport apparatus for transporting the poultry bodies along a transport path, a holding apparatus arranged on the transport conveyor for holding the poultry bodies, and a knife assembly arranged along the transport path. The knife assembly has a pair of separating knives for cutting the breast fillets along the breastbone, the knives arranged on either side. A centring means is associated with the knife assembly for pre-centring the breastbone, and has (Continued)

two centring elements which are each movable out of a stand-by position positioned outside the transport path, into a centring position positioned on the transport path, and back. The centring elements in their centring position are located at least partly in front of the separating knives.

21 Claims, 8 Drawing Sheets

(58) Field of Classification Search
 USPC .......................................................... 452/149
 See application file for complete search history.

(56) References Cited

U.S. PATENT DOCUMENTS

| | | | | |
|---|---|---|---|---|
| 5,569,069 | A * | 10/1996 | Horst ................. | A22C 21/0023 |
| | | | | 452/169 |
| 7,335,095 | B2 * | 2/2008 | Sekiguchi .......... | A22C 21/0023 |
| | | | | 452/169 |
| 8,721,404 | B2 * | 5/2014 | Landt ................. | A22C 21/0069 |
| | | | | 452/149 |
| 9,220,283 | B2 * | 12/2015 | Landt ................... | A22C 21/003 |
| 9,433,223 | B2 * | 9/2016 | Landt ................. | A22C 21/0053 |

FOREIGN PATENT DOCUMENTS

| | | |
|---|---|---|
| DE | 102010047660 B4 | 9/2016 |
| EP | 2606735 A1 | 6/2013 |
| EP | 2622962 A1 | 8/2013 |
| JP | 2012249599 A | 12/2012 |
| WO | 2017131519 A1 | 8/2017 |

* cited by examiner

APPARATUS AND METHOD FOR CUTTING INTO BREAST FILLETS THAT ARE CONNECTED TO ONE ANOTHER AT LEAST IN THE REGION OF A BREASTBONE OF A CARCASS OF POULTRY BODIES OR PARTS THEREOF, WHEREIN THE BREAST FILLETS ARE CUT ALONG THE BREASTBONE

CROSS-REFERENCE TO RELATED APPLICATIONS

This application is the U.S. National Stage of PCT/EP2020/067496 filed Jun. 23, 2020, which claims priority to German Patent Application No. 10 2019 118 268.9 filed Jul. 5, 2019, the content of both of which are incorporated herein by reference in their entirety.

FIELD OF THE INVENTION

The invention relates to an apparatus, configured and adapted for cutting into breast fillets that are connected to one another at least in the region of a breastbone of a carcass of poultry bodies or parts thereof, the breast fillets being cut into along the breastbone, comprising a transport apparatus having a revolvingly drivable transport conveyor for transporting, neck first, the poultry bodies or parts thereof to be processed in a transport direction T along a transport path defining a transport plane E, at least one holding apparatus, arranged on the transport conveyor, for receiving and holding the poultry bodies or parts thereof during transport along the transport path in the transport plane, a knife assembly, arranged along the transport path in the region of the transport conveyor, having a pair of separating knives for cutting the breast fillets along the breastbone, wherein one separating knife, each, is arranged on either side of the centre axis of the transport path such that there is formed between the two separating knives a gap A for transport of the poultry bodies or parts thereof to be processed with the breastbone through the mutually opposite separating knives.

The invention relates further to a method for cutting into breast fillets that are connected to one another at least in the region of a breastbone of a carcass of poultry bodies or parts thereof, the breast fillets being cut into along the breastbone, comprising the steps:

transporting, neck first, the poultry bodies or parts thereof to be processed in a transport direction T along a transport path defining a transport plane E, wherein the poultry bodies or parts thereof are transported by means of a revolvingly driven transport conveyor along the transport path to and through at least one knife assembly, threading the breastbone of the carcass between a pair of separating knives of the knife assembly, and cutting the breast fillets on either side of the breastbone along the breastbone by means of the separating knives.

BACKGROUND OF THE INVENTION

Such apparatuses and methods are used in the poultry processing industry for fully automatically or semi-automatically loosening two individual breast fillets from the carcass or from carcass portions (referred to generally as the carcass hereinbelow) of an eviscerated poultry body or parts thereof, or cutting into them or separating them completely from the carcass. An individual breast fillet can be understood as being only an outer fillet. The breast fillet can, however, also consist of an inner fillet and an outer fillet. Within the meaning of the invention, cutting into the breast fillet accordingly includes both completely loosening from the carcass breast fillets that have already been partly loosened from the carcass of an eviscerated poultry body or parts thereof, that is to say obtaining individual breast fillets by separating from the breastbone the breast fillets that hang down on either side of the breastbone of the carcass and are still connected to one another in the region of the breastbone, and cutting into the breast fillets along the breastbone, for example in the case where a pre-cut has not yet been made, that is to say the breast fillets are accordingly still completely connected to the carcass. Both variants serve to obtain individual breast fillets, in contrast to the obtainment of breast fillets that are connected to one another, so-called butterfly fillets.

The poultry bodies or parts thereof can be, for example, front halves or in particular so-called breast caps, that is to say front halves freed at least from the back region and parts of the ribs. The poultry bodies or parts thereof, that is to say, for example, the breast caps, are saddled in a breast cap filleting machine onto the holding apparatus of the transport conveyor, that is to say slipped with the open abdominal cavity onto the holding apparatus, such that a breastbone plate of the breastbone of the carcass lies on the holding apparatus and the breastbone protrudes perpendicularly from the holding apparatus. When the holding apparatus with the poultry body or parts thereof reaches the knife assembly, the poultry body or parts thereof is oriented neck first in the transport direction T in that the holding apparatus is correspondingly positioned or the corresponding orientation is chosen at the saddling stage. Neck first means that the poultry bodies or parts thereof preferably freed of extremities, of the head and in part also of the neck are transported with the neck side leading, so that a breastbone crest process of the breastbone of the carcass is leading and a breastbone crest of the breastbone of the carcass projects downwards substantially perpendicularly to the breastbone plate.

In order to avoid miscuts, for example as a result of the separating knives penetrating the carcass, it is necessary that the breast caps with their breastbone are guided or transported as centrally as possible into the gap A between the separating knives. However, breast caps which are saddled crookedly or breastbones which have grown crookedly frequently prevent precise introduction of the breastbone between the separating knives, so that apparatuses known hitherto have the disadvantage that miscuts that occur disrupt the production process and correspondingly reduce the output. However, an attempt to reduce the risk of miscuts by means of controlled separating knives, for example, leads to losses of output because of the greater distance between the separating knives and the carcass or the breastbone. Other possibilities for reducing the risk of miscuts, for example by means of centring plates or the like, result in the breast fillets already being loosened from the carcass to such an extent that, for example, semi-automatic processing, namely the manual removal of the breast fillets from the carcass, is ruled out since the breast fillets are no longer sufficiently connected to the carcass.

SUMMARY OF THE INVENTION

Accordingly, the object underlying the invention is to provide an apparatus which ensures that individual breast fillets are obtained reliably and efficiently in terms of output. The object consists further in proposing a corresponding method.

This object is achieved according to the invention by an apparatus having the features mentioned hereinbefore, which is characterised in that there is associated with the knife assembly a centring means which is configured and adapted for pre-centring the breastbone of the carcass and which comprises two centring elements which are each movable out of a stand-by position, in which the centring elements are positioned outside the transport path, into a centring position, in which the centring elements are positioned on the transport path, and back, wherein the centring elements in their centring position are located at least partly in front of the two separating knives in the transport direction T of the poultry bodies or parts thereof.

In front of the separating knives means that the poultry bodies or parts thereof, for example the breast cap with its breastbone crest process, on transport along the transport path in the transport direction T, first meet the centring elements and only then meet the separating knives. By means of the centring means according to the invention it is ensured that the breastbone, before entering between the separating knives, regardless of the positioning of the poultry bodies or parts thereof on the holding apparatus and of anatomical variations of the carcass, is reliably "caught" and centred in order to guide it in the centred position between the separating knives. In the stand-by position outside the transport path, the holding apparatus with the poultry body or parts thereof is able to pass the centring means without colliding therewith. In the centring position on or in the transport path, an interaction necessarily takes place between the centring means and the poultry body or parts thereof, namely in particular engagement of the centring elements into the poultry body or parts thereof. The apparatus according to the invention thus leads to a significantly reduced number of miscuts and accordingly to an increased output.

Advantageously, the transport conveyor has an upper run and a lower run, wherein the knife assembly is arranged in the region of the lower run. As a result, saddling of the poultry bodies or parts thereof onto the holding apparatus on the one hand and the alignment of the poultry bodies or parts thereof in relation to the knife assembly is simplified, whereby centring is also optimised.

Preferably, the knife assembly with the centring means is arranged on a knife rocker element which is movable up and down relative to the transport path. In other words, the knife rocker element is movable at least vertically relative to the transport plane E, namely preferably pivotable about a pivot axis M, so that in particular the separating knives are movable away downwards on cutting into the breast fillets in order to avoid collisions with the carcass and in particular with the breastbone plate. By the arrangement of the separating knives on the one hand and the centring elements on the other hand at or on the common knife rocker element, the mutually adapted positioning of the centring elements in relation to the separating knives is always ensured. The pivoting movement of the knife rocker element can be carried out, for example, via a cam control or by means of at least one pneumatic cylinder. Optionally, the knife rocker element can also be mounted so as to be deflectable transversely to the transport direction T, for example via spring elements. The pivot axis M preferably lies in or parallel to the transport plane E.

A preferred embodiment is characterised in that there is associated with each centring element a pneumatic cylinder which is configured and adapted for carrying out the pivoting movement of the centring elements about a pivot axis S. The centring elements can also jointly be movable synchronously via an actuating means. Preference is given, however, to separate and individual control of the centring elements. By means of the or each pneumatic cylinder, the pivoting movement out of the stand-by position into the centring position and back can be carried out and controlled particularly quickly and precisely, whereby on the one hand reliable and precise centring is ensured and on the other hand a pivoting movement that protects the product is ensured.

Expediently, the pivot axes S of the centring elements are oriented perpendicularly to the transport plane E spanned by the transport path. An inclined orientation is also possible. Preferably, the perpendicular orientation of the pivot axes S ensures that the centring elements, or at least a part thereof, preferably the portions that penetrate the poultry bodies, pivot in or parallel to the transport plane E and thus enter the poultry bodies or parts thereof parallel to the breastbone, in order to centre the carcass.

An advantageous further development is distinguished in that the centring elements are centring fingers without cutting edges, wherein free ends of the centring fingers are configured and shaped to enter the poultry body or parts thereof close to the breastbone contrary to the transport direction T in each case between the inner fillet and the outer fillet. When seen contrary to the transport direction T, the centring fingers ideally enter the poultry body or parts thereof on either side at a slight distance from the breastbone and beneath the inner fillet and partly displacing the outer fillet. At a slight distance means in this context that the two centring fingers are able to securely "catch" the breastbone. Without cutting edges within the meaning of the invention means that the centring fingers can ultimately have any desired shape and contour which ensure that, on entry, neither the inner fillets nor the outer fillets of the breast fillet are damaged. Rounded edges, which on the one hand prevent injury/damage to the breast fillet and on the other hand facilitate and assist with entry, are particularly simple. The described form ensures and assists with precise centring of the breastbone in a manner that protects the product.

Advantageously, the centring elements, at least in their centring position, are configured and mounted on the knife rocker element so as to be deflectable by means of a spring element against a spring force. The centring elements, even in the centring position in which they are at the smallest distance from the breastbone, are thus able to "catch" the breastbone reliably and in a manner that protects the product, for example in the case of an irregular structure of the carcass or other interfering effects. In particular, the risk of damage to the inner and outer fillets is reduced by the resilient deflectability of the centring elements. The spring elements are fastened on the one hand to the centring element and on the other hand to the knife rocker element, wherein fastening can also take place outside the knife rocker element. Instead of the spring elements, other damping elements can also be used.

Particularly preferably, the centring elements are pivotable by means of the spring element about a pivot axis F, wherein the pivot axes F, in the centring position, are oriented substantially parallel to the transport direction T. The pivot axes F for the resilient deflecting movement of the centring elements on the one hand and the pivot axes S for the movement of the centring elements out of the stand-by position into the centring position and back preferably correspondingly differ from one another in respect of their orientation, in order to be able to superpose the movements simply and precisely. The orientation of the pivot axes F can, however, also vary. All the above-mentioned pivoting movements can also be superposed on the pivoting movement of the knife rocker element about the pivot axis M.

Particularly preferably, the pneumatic cylinders for controlling the pivoting movement about the pivot axis S are connected to a control and/or regulating device. The pivoting movements can thereby be matched individually and precisely to the processing operation in question, for example to the transport speed of the transport conveyor or the like, in order to ensure precise and reliable centring.

Advantageously, the centring elements, on pivoting about the pivot axis S out of the stand-by position into the centring position, have a main movement component contrary to the transport direction T and, on pivoting out of the centring position into the stand-by position, have a main movement component in the transport direction T. Optionally, a linear movement is also possible. However, a pivoting movement is preferred, wherein multiple direction components always arise on pivoting. The important factor is that the resulting main movement component in the centring position of the centring elements is directed contrary to the transport direction T, so that the poultry bodies or parts thereof meet the centring elements with their neck side to the front, and that the resulting main movement component on pivoting into the stand-by position is directed in the transport direction T, in order to bring the centring elements out of engagement with the poultry body or parts thereof in a damage-free manner in relation to the breast fillets.

Particularly preferably, the centring elements in the centring position are so situated relative to one another and are so positioned that the centring elements, starting from their free ends, run towards one another with their mutually facing inner sides in the transport direction T to a minimum distance B greater than zero, in order to "catch" the breastbone or a breastbone crest process of the breastbone, wherein the minimum distance B between the centring elements in the centring position is smaller than the gap A between the separating knives, in order to guide the breastbone centrally between the separating knives. Preferably, at least the mutually facing inner sides each have a profile that is bent in an arcuate or other manner, whereby a funnel-shaped narrowing to the minimum distance B is obtained. Simple and reliable centring is thus ensured.

A preferred embodiment is characterised in that the size of the gap A between the separating knives is configured to be fixed but adjustable and is preferably between 6 and 8 millimetres, and in that the size of the minimum distance B between the centring elements in the centring position is fixed but adjustable and is preferably 5 millimetres. Fixed means that the distance is preset to a desired value, but does not exclude a deflecting movement during operation with a temporary increase in the distance. Adjustable means, consistently with the fixed adjustment, that this adjustment is changeable to the desired value, namely in particular in the case of an apparatus that is out of operation, for example when larger poultry bodies or parts thereof with a thicker breastbone are to be processed. With this configuration, central and collision-free transfer or supplying of the breastbone by the centring elements between the separating knives is ensured.

Particularly preferably, the separating knives are rotatingly drivable circular knives which are arranged spaced apart from one another to form a gap A which serves to receive the breastbone. With the circular knives as the separating knives, cutting of the breast fillets on the from the centrally fed carcasses is ensured particularly simply and precisely.

Advantageously, the circular knives are driven contrary to the transport direction T of the poultry bodies or parts thereof. In other words, the circular knives are driven in the opposite direction to the transport direction T. Optionally, however, a concurrent drive direction of the circular knives is possible. Ultimately, the drive direction of the two circular knives can be the same or different. The circular knives can be driven countercurrently, for example, contrary to the transport direction T. An additional centring effect is achieved with the countercurrent drive direction of the circular knives.

The apparatus according to the invention is particularly preferably configured and adapted for cutting breast fillets on breast caps as part of a poultry body, in particular when the breast caps are supplied to the knife assembly free of the wishbone. Optionally, the apparatus is also configured and adapted for cutting breast fillets on or from front halves whose carcasses are supplied with or without the wishbone. The mentioned advantages and effects of the centring come to bear in particular in the semi-automatic harvesting of individual breast fillets from breast caps in semi-automatic breast cap filleting machines.

The object is also achieved by a method having the steps mentioned hereinbefore in that the breastbone, before the separating knives engage into the breast fillets, is pre-centred by means of a centring means in that centring elements of the centring means are moved from both sides of the transport path out of a stand-by position outside the transport path into a centring position on the transport path, and in that the centring elements are moved back into the stand-by position as soon as a breastbone crest process of the breastbone of the carcass is situated between the separating knives.

Advantageously, centring fingers as the centring elements enter with their free ends, on pivoting about pivot axes S out of the stand-by position into the centring position, on either side of the transport path into the poultry body or parts thereof close to the breastbone in each case between the inner fillet and the outer fillet and thereby centre the breastbone before it enters between the separating knives.

A further development is characterised in that the movement of the centring elements out of the stand-by position into the centring position takes place with a resulting main movement component contrary to the transport direction T, and the movement out of the centring position into the stand-by position takes place with a resulting main movement component in the transport direction.

Preferably, the poultry bodies or parts thereof transported in the transport direction T meet centring elements which have already been moved out of the stand-by position into the centring position and are then stationary. In other words, the pivoting movement into the centring position is already complete when the breastbone of the carcass is "threaded" between the centring elements.

Advantageously, the centring elements, at least on moving out of the centring position into the stand-by position, are accelerated at least temporarily to a speed that is greater than the transport speed of the transport conveyor. The centring elements are thus ahead of the transport conveyor, as it were, in order to move the centring elements in a manner that protects the product out of the poultry body or parts thereof continuously transported further in the transport direction T.

Particularly preferably, the method is carried out with an apparatus as disclosed herein.

The advantages and effects arising therefrom have already been described in connection with the apparatus, and for this reason, in order to avoid repetition, reference is made to the preceding passages.

BRIEF DESCRIPTION OF THE DRAWINGS

Further expedient and/or advantageous features and further developments relating to the apparatus and to the method will become apparent from the description. Particularly preferred embodiments of the apparatus and the method will be explained in greater detail with reference to the accompanying drawing, in which.

DETAILED DESCRIPTION OF THE INVENTION

Figure 1:
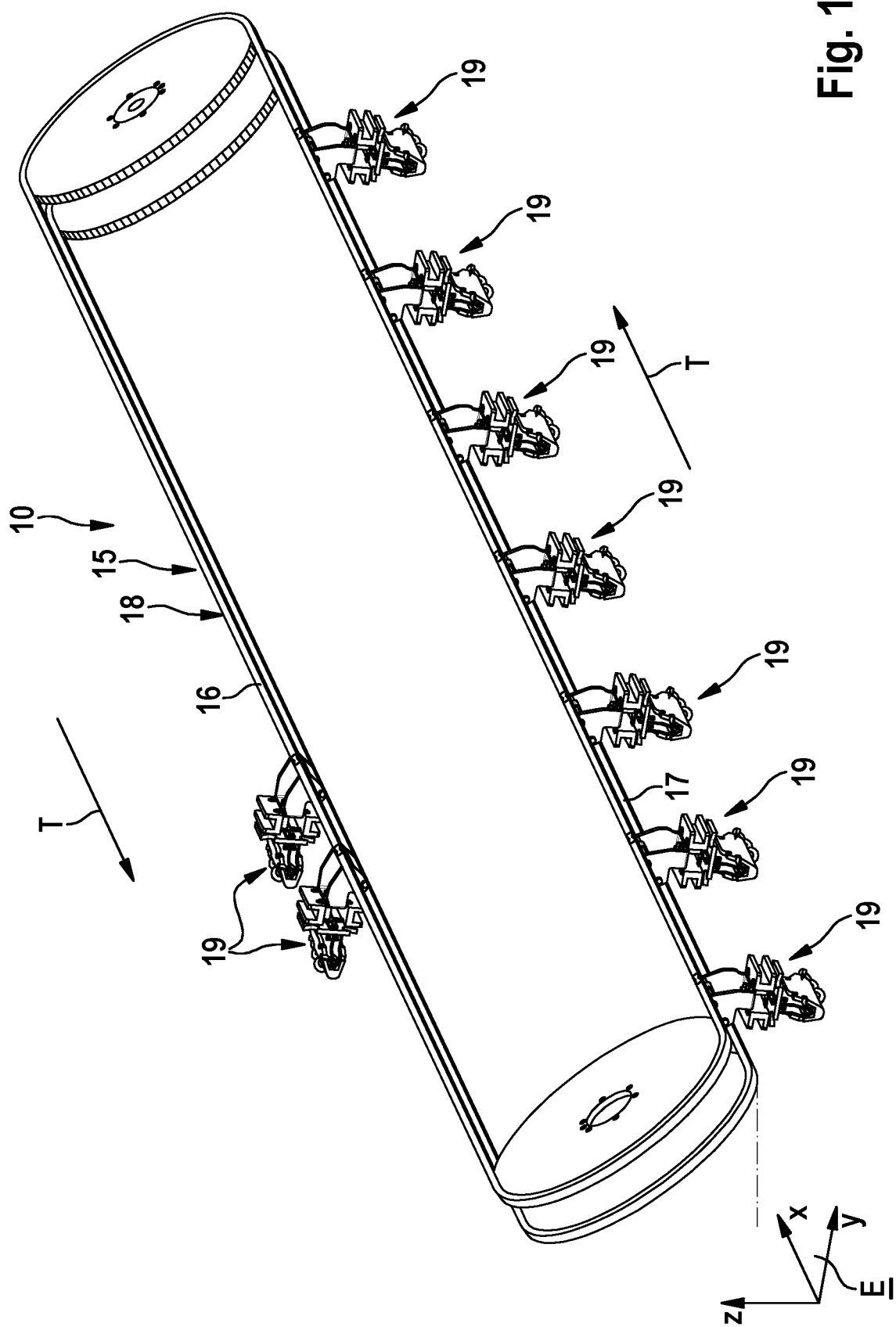
FIG. 1 shows a schematic illustration of an apparatus according to the invention in a perspective view

The apparatus illustrated in the drawing is configured and adapted for cutting, that is to say in particular cutting into, pre-cutting or cutting off, breast fillets of a breast cap of a poultry body along the breastbone. The apparatus is, however, equally configured and adapted for cutting breast fillets of a front half of a poultry body.

The illustrated apparatus 10 is configured and adapted for cutting into breast fillets 14 that are connected to one another at least in the region of a breastbone 11 of a carcass 12 of poultry bodies 13 or parts thereof, the breast fillets being cut into along the breastbone 11, and comprises a transport apparatus 15 having a revolvingly drivable transport conveyor 18 for transporting, neck first, the poultry bodies 13 or parts thereof to be processed in a transport direction T along a transport path defining a transport plane E, at least one holding apparatus 19, arranged on the transport conveyor 18, for receiving and holding the poultry bodies 13 or parts thereof during transport along the transport path in the transport plane E, a knife assembly 20, arranged along the transport path in the region of the transport conveyor 18, having a pair of separating knives 21, 22 for cutting the breast fillets 14 along the breastbone 11, wherein one separating knife 21, 22, each, is arranged on either side of the centre axis K of the transport path such that there is formed between the two separating knives 21, 22 a gap A for transport of the poultry bodies 13 or parts thereof to be processed with the breastbone 11 through the mutually opposite separating knives 21, 22.

Figure 2A:
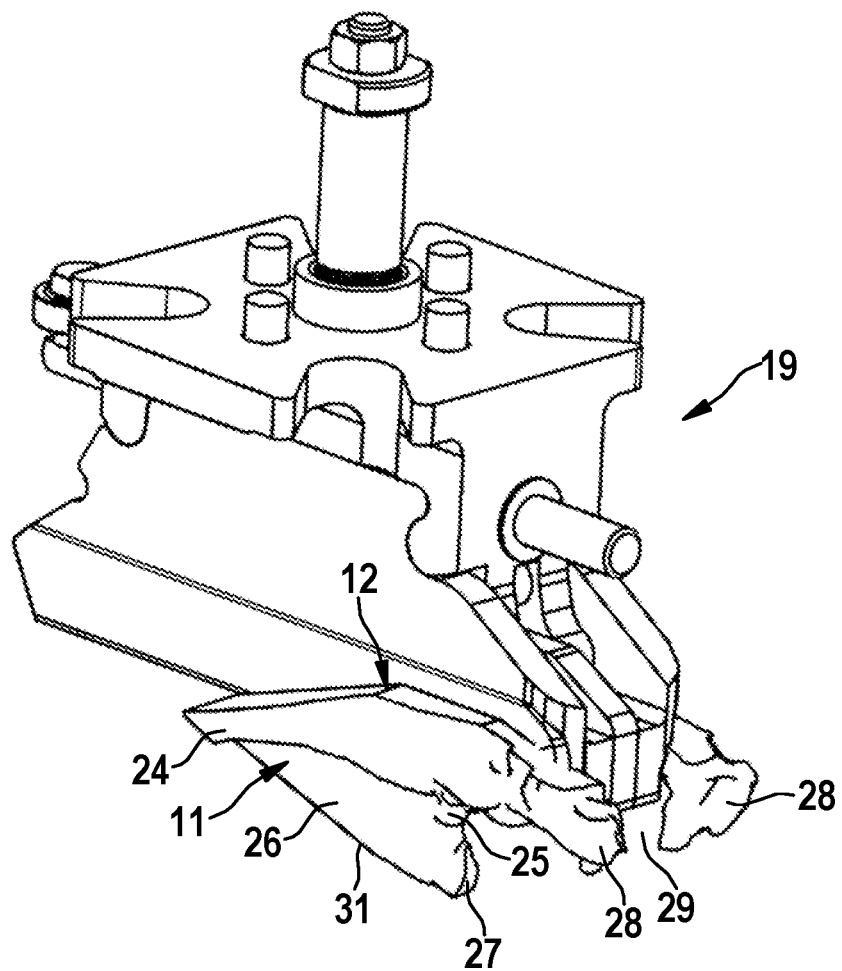
FIG. 2a shows a schematic illustration of a breast cap carcass, without a wishbone, fixed to a holding apparatus of a transport conveyor, in order to explain the anatomy of the poultry body or parts thereof to be processed.
Figure 2B:
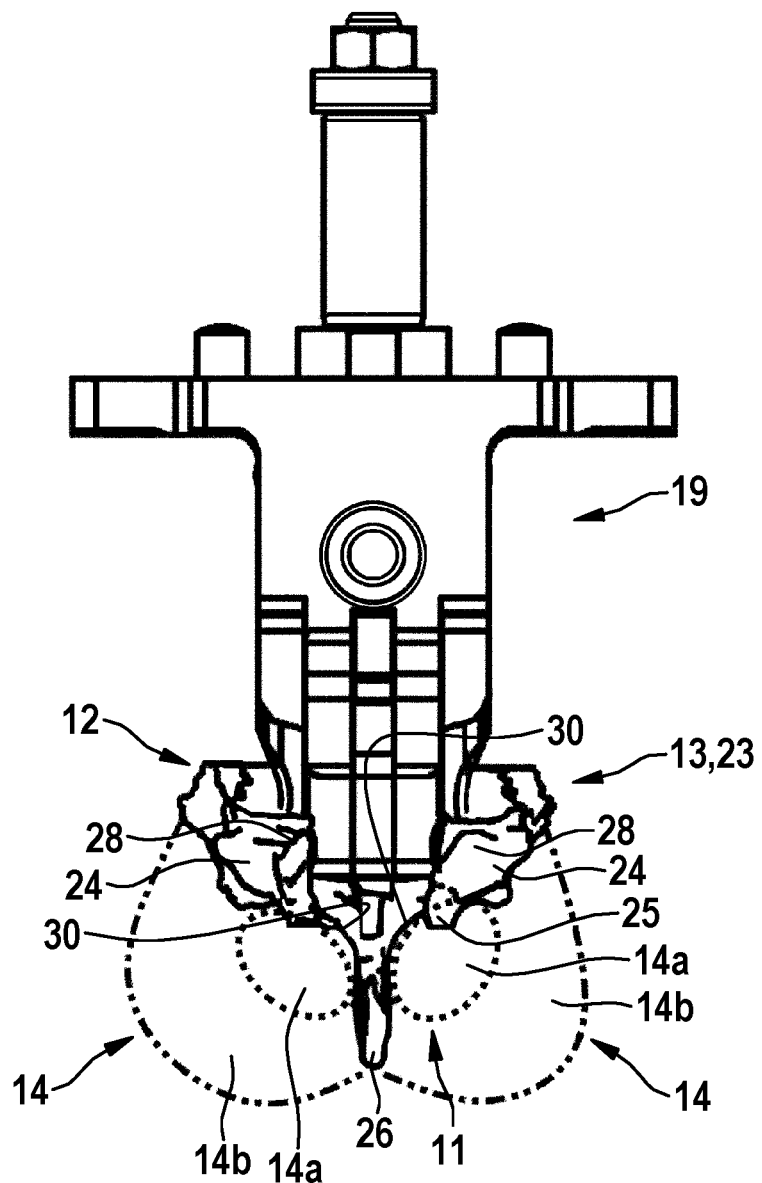
FIG. 2b shows the illustration according to FIG. 1 in a front view contrary to the transport direction T, wherein the breast fillets are shown on the carcass.
Figure 3:
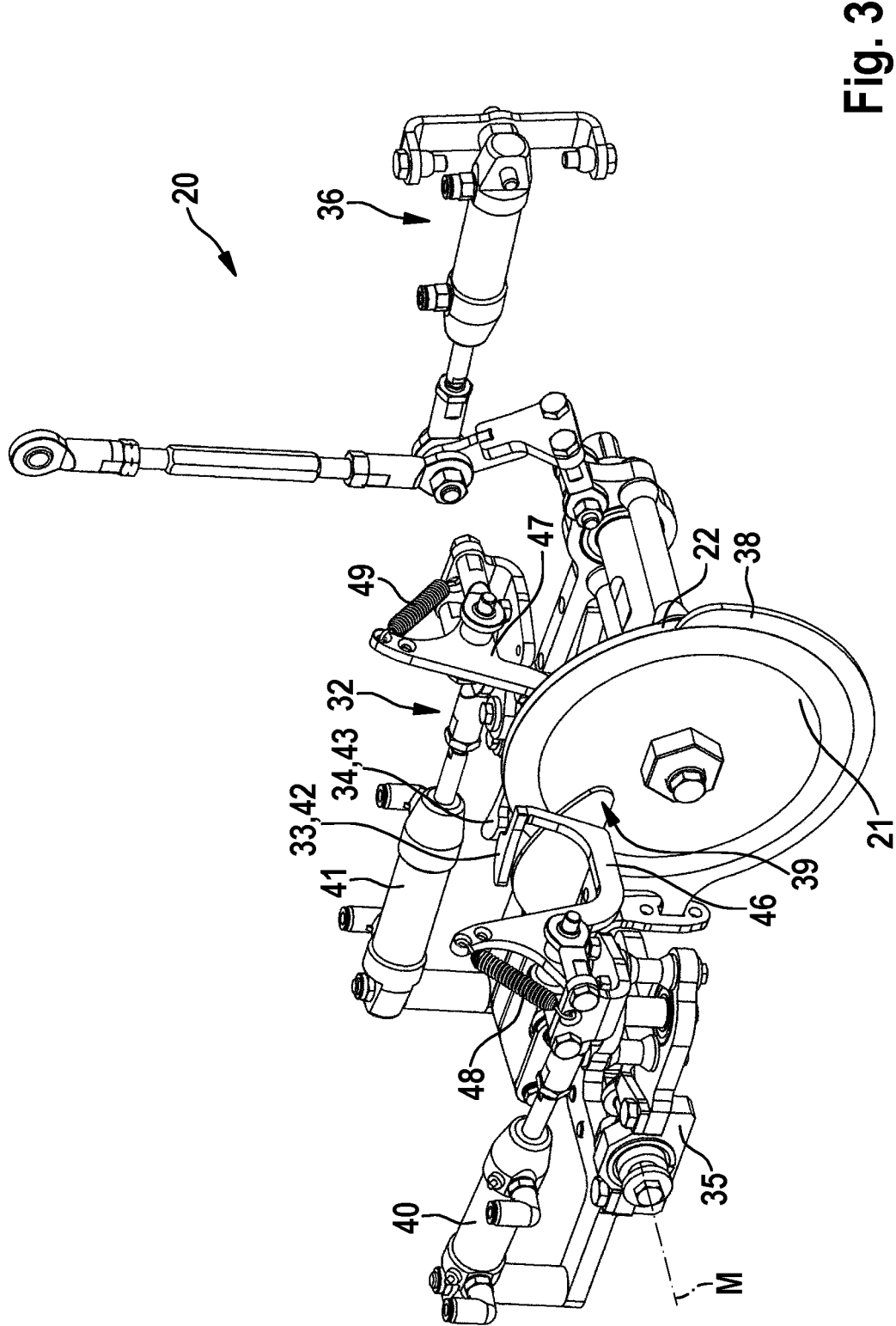
FIG. 3 shows a schematic illustration of the knife assembly of the apparatus according to FIG. 1 in a perspective view, wherein the centring elements are in their centring position.
Figure 4:
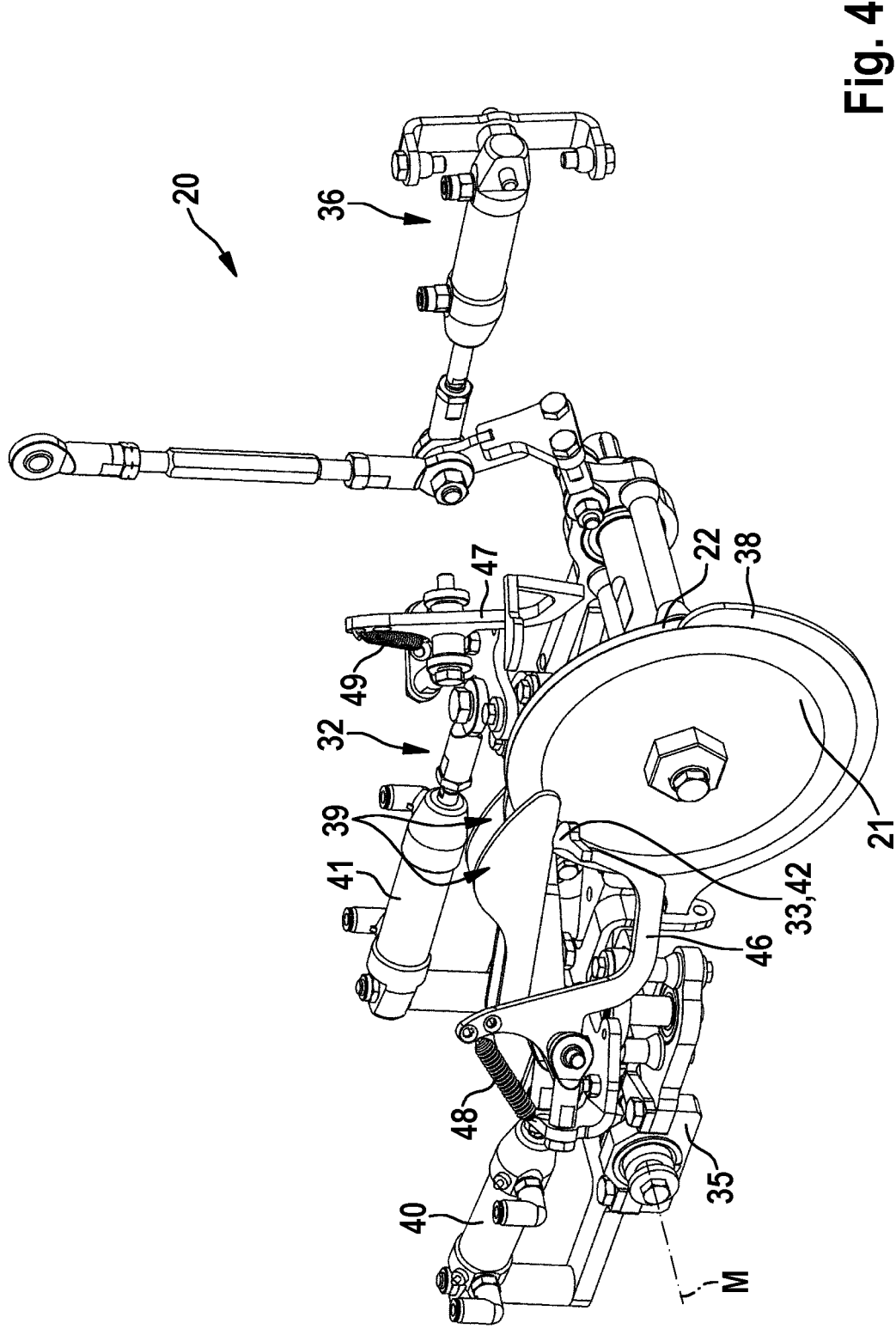
FIG. 4 shows the illustration according to FIG. 3 with centring elements in their stand-by position.

For better understanding of the invention, the anatomy of the poultry bodies 13 or parts thereof to be processed by means of the invention will first be described. The apparatus 10 according to the invention is configured and adapted in particular for the automatic or semi-automatic processing of so-called breast caps 23, in which the carcass 12 comprises the breastbone 11 with rib appendages 24 and optionally also the wishbone, wherein breast fillets 14, that is to say an inner fillet 14a and an outer fillet 14b on either side of the breastbone 11, are still located on the carcass 12 or are at least partly connected thereto. The breastbone 11 comprises a breastbone plate 25, which in the saddled state of the carcass 12 lies on the holding apparatus 19 and, when the holding apparatus 19 is positioned in the region of the transport conveyor 18, extends substantially parallel to the transport plane E immediately before passing through the knife assembly 20. A breastbone crest 26 extends substantially perpendicularly to the breastbone plate 25. In simple terms, the breastbone plate 25 and the breastbone crest 26, when seen from the front (see in particular FIG. 2b), form a T-shape, with the breastbone plate 25 as the horizontal leg of the T and the breastbone crest 26 as the vertical main leg. In advance in the transport direction T, the breastbone crest 26 has a breastbone crest process 27. Yet further in advance in the transport direction T, the carcass 12, or the poultry carcass portion, has shoulder joints 28. In the example shown, the carcass 12 is already missing the wishbone. The region of the shoulder joints 28 also marks the neck (appendage) 29. In other examples, the wishbone can still be arranged in the region of the shoulder joints 28. The inner fillets 14a lie on either side of the breastbone 11 in the throat 30 formed by the breastbone plate 25 and the breastbone crest 26. The outer fillets 14b initially cover the inner fillets 14a completely and extend from rib appendages 24 to the free end 31 of the breastbone crest 26.

In the case where the breast caps 23 to be processed have not yet been pre-cut, that is to say the outer fillets 14b are still situated completely on the carcass 12 and cover the inner fillets 14a completely, cutting of the breast fillets 14 is a cutting in along the breastbone 11, wherein the separating knives 21, 22 plunge in on either side of the breastbone 11 and detach the connection of the outer fillet 14b and the inner fillet 14a to the breastbone 11. The individual breast fillets, which are then detached in the region of the breastbone 11, that is to say only the outer fillets 14b or also the outer fillet 14b and the inner fillet 14a, can then be pulled, for example manually, from the carcass 12. In the other case, where the breast fillets 14 and in particular the outer fillets 14b are already partially detached from the carcass 12 of an eviscerated poultry body 13 or parts thereof and hang down on either side of the breastbone 11 and are connected to one another and fastened to the carcass 12 only in the region of the free end 31 of the breastbone crest 26, the cutting of the breast fillets 14 is a cutting off along the breastbone 11.

The invention described hereinbelow relates to the cutting of breast fillets 14 in all the configurations mentioned above.

Figure 5:
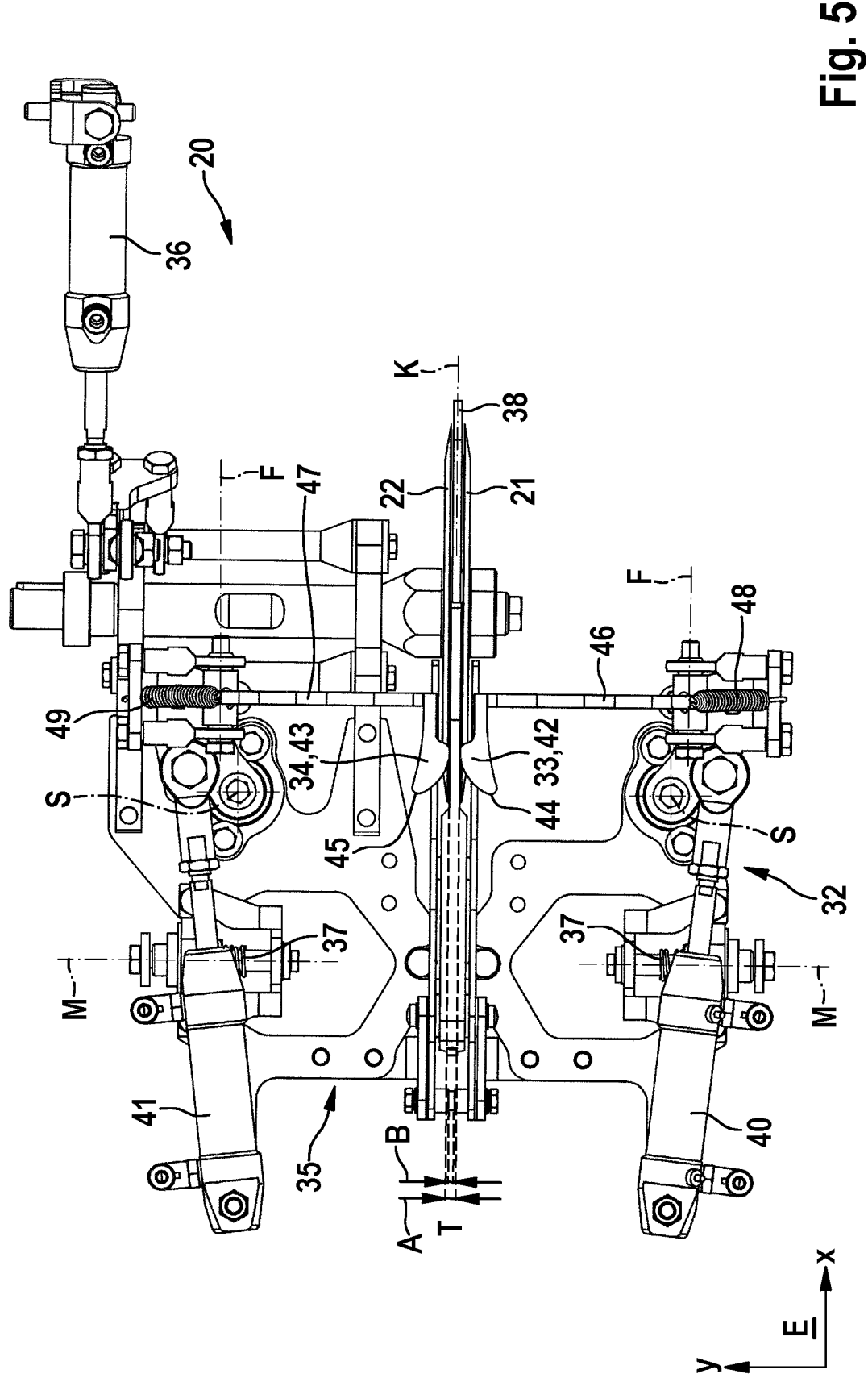
FIG. 5 is a plan view of the knife assembly according to FIG. 3.
Figure 6:
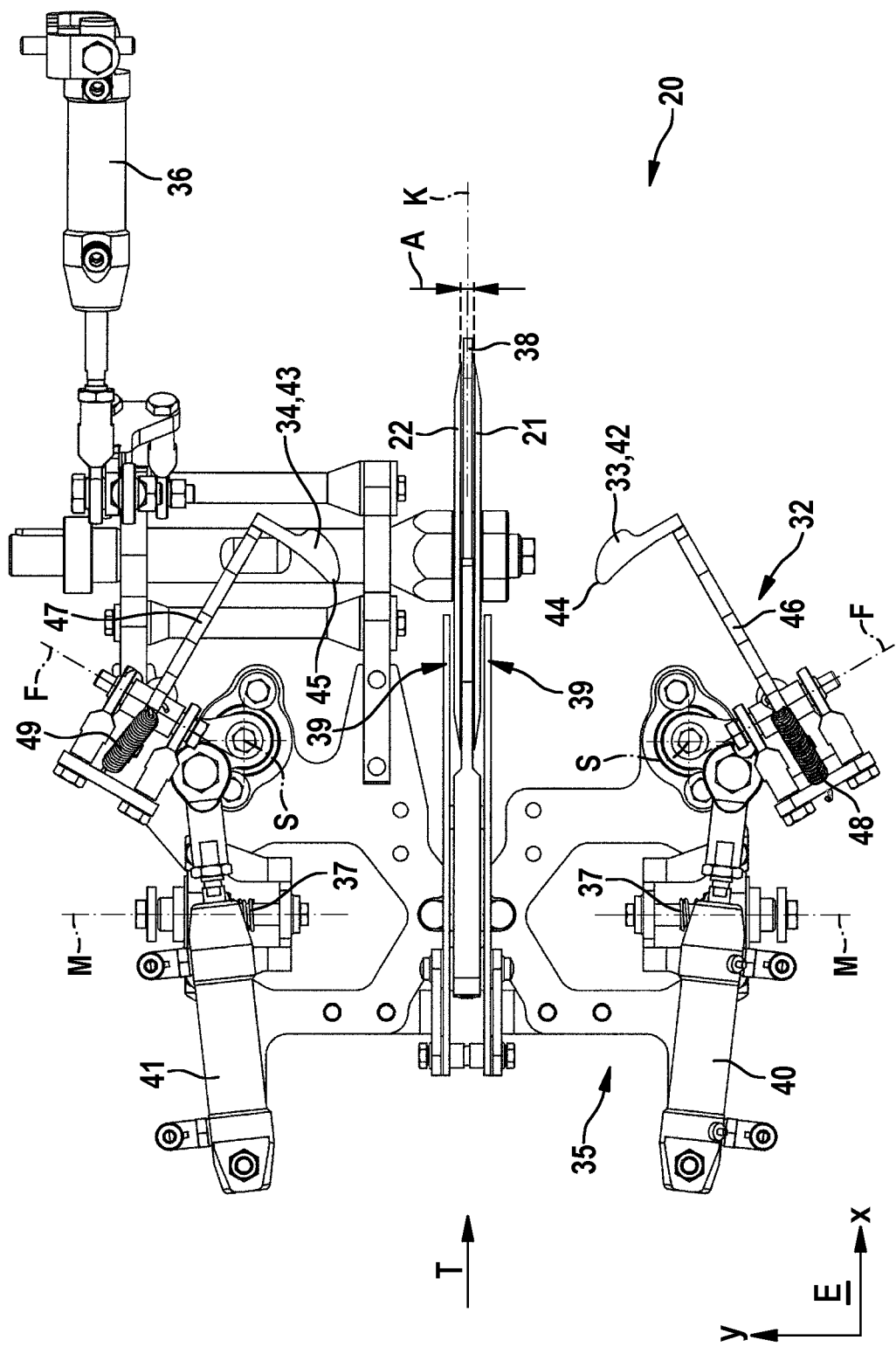
FIG. 6 is a plan view of the knife assembly according to FIG. 4.
Figure 7:
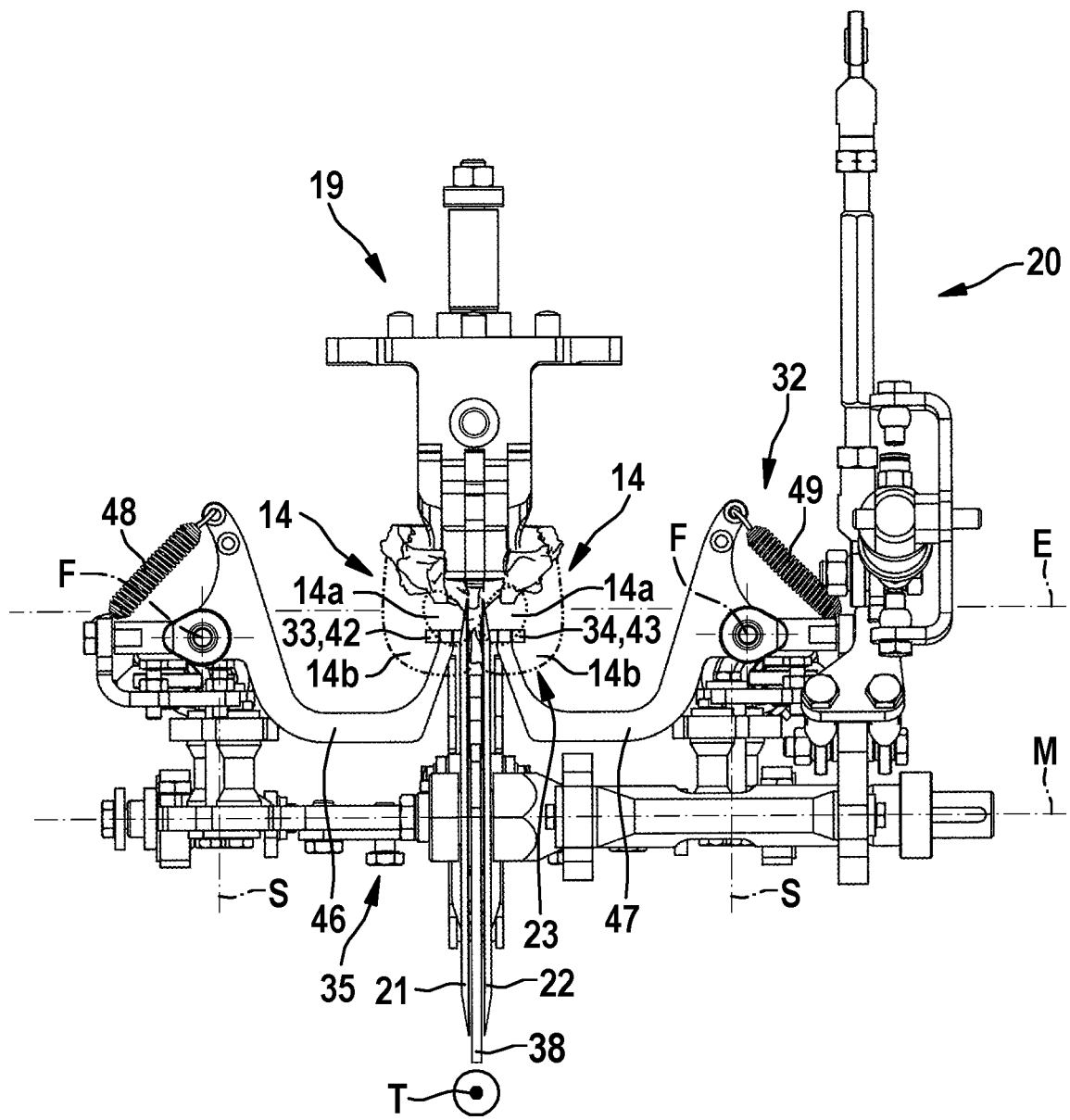
FIG. 7 is a front view of the knife assembly according to FIG. 3 seen contrary to the transport direction T.

This apparatus 10 is distinguished according to the invention in that there is associated with the knife assembly 20 a centring means 32 which is configured and adapted for pre-centring the breastbone 11 of the carcass 12 and which comprises two centring elements 33, 34, which are each movable out of a stand-by position (see e.g. FIG. 6), in which the centring elements 33, 34 are positioned outside the transport path, into a centring position (see e.g. FIG. 5), in which the centring elements 33, 34 are positioned on the transport path, and back, wherein the centring elements 33, 34 in their centring position are located at least partly in front of the two separating knives 21, 22 in the transport direction T of the poultry bodies 13 or parts thereof. The centring elements 33, 34 are not located completely in front of the separating knives 21, 22. Preferably, the centring elements 33, 34 in the centring position are located with their free ends at least partly in front of the separating knives 21, 22.

The features and further developments described hereinbelow constitute preferred embodiments when considered on their own or in combination with one another. It is expressly pointed out that features which are combined in the claims and/or the description and/or the drawing or which are described in a common embodiment can further develop the apparatus 10 described hereinbefore also functionally independently.

Preferably, the transport conveyor 18 has an upper run 16 and a lower run 17, wherein the knife assembly 20 is arranged in the region of the lower run 17. The upper run 16 and the lower run 17 can, however, also lie in a plane, that is to say, for example, next to one another. Preferably, a plurality of holding apparatuses 19 is also arranged on the transport conveyor 18.

The term transport path refers to the section along the transport conveyor 18 on which processing stations are arranged or can be arranged, that is to say substantially along the upper run 16 and the lower run 17, and ultimately describes a three-dimensional region through which the poultry bodies 13 travel or pass as they are transported in the transport direction T. If there is something on or in the transport path of the poultry bodies 13, for example the separating knives, the poultry body 13 collides therewith or comes into engagement therewith or interacts therewith. There results from the transport path the transport plane E. In other words, the transport path defines the transport plane E, which is accordingly not to be understood mathematically. In FIGS. 2b, 5, 6 and 7, the transport plane E is indicated. The transport direction T lies in the transport plane E, or parallel thereto. Preferably, the transport plane E is oriented horizontally. The transport plane E can, however, also be oriented in an inclined manner.

The knife assembly 20 is arranged with the centring means 32 on a knife rocker element 35 which is movable up and down relative to the transport path. The knife rocker element 35 is preferably pivotable about a pivot axis M. Pivoting can take place, for example, by means of a cam control. Preferably, however, there is associated with the knife rocker element 35 at least one pneumatic cylinder 36 which is preferably connected to a control and/or regulating device, not shown explicitly. The drive, likewise not shown explicitly, for the transport conveyor 18, for example, can also be connected to this control and/or regulating device. Further components, such as, for example, measuring devices, sensors or the like, can also be connected to the control and/or regulating device. As mentioned, the knife rocker element 35 is pivotable about the pivot axis M, such that the knife assembly 20 and with it the centring means 32 is movable downwards substantially perpendicularly to the transport plane E and back, in order to change the distance of the separating knives 21, 22 from the carcass 12. In addition, the knife rocker element 35 can also be mounted so as to be deflectable transversely to the transport direction T, for example against a spring force applied by spring elements 37.

Optionally, a plate-like protective element 38, for example, can be arranged between the separating knives 21, 22, which protective element protrudes from the separating knives 21, 22 contrary to the transport direction T of the poultry bodies 13, that is to say at least in the intake region of the breastbone 11 between the separating knives 21, 22. The protective element 38 is preferably spring-mounted and protrudes from the separating knives 21, 22 with one edge contrary to the transport direction T, so that incoming poultry bodies 13 or the outer fillets 14b thereof (which may also be hanging down) first meet only the protective element 38. By means of the breastbone 11, the protective element 38 can be pushed downwards against the spring force, in order to free the separating knives 21, 22 as it were. To this end, the protective element 38 is, for example, pivotably mounted on the knife rocker element 35. The protective element 38 can, however, also be fastened in a fixed and unyielding manner to the knife rocker element 35. In addition to the protective element 38, further fixed or yielding protective elements can be arranged in the region of the separating knives 21, 22.

It is further possible to provide on either side of the separating knives 21, 22 tensioning elements 39 for tensioning the breast fillets 14 in the region of the breastbone 11 during the cutting operation. The tensioning elements 39 are, for example, optionally synchronously pivotably mounted, plate-like tensioning bodies which are pivotable out of a lower stand-by position into an upper tensioning position and back. The tensioning bodies can be actuable and controllable, for example, by means of a pneumatic cylinder or the like as actuating means. Preferably, the actuating means is connected to the control and/or regulating device in order to be able to carry out a movement coordinated in particular with the centring elements 33, 34.

In a preferred embodiment, there is associated with each centring element 33, 34 a pneumatic cylinder 40, 41 which is configured and adapted for carrying out the pivoting movement of the centring elements 33, 34 about a pivot axis S. In other cases, the centring elements 33, 34 can also be moved by means of other actuating members. Preferably, the pneumatic cylinders 40, 41 are connected to the control and/or regulating device for control of the pivoting movement about the pivot axis S. It is also possible that the two centring elements 33, 34 are movable synchronously by means of a common actuating member. Preferably, the pivot axes S of the centring elements 33, 34 are oriented perpendicularly to the transport plane E spanned by the transport path. The pivot axes S can of course also be oriented, alternative to a perpendicular orientation, in an inclined manner relative to the transport plane E. The pivot axes S of the two centring elements 33, 34 preferably extend parallel to one another.

The centring elements 33, 34 can have any desired basic form. Preferably, the centring elements 33, 34 are centring fingers 42, 43 without cutting edges, wherein free ends 44, 45 of the centring fingers 42, 43 are configured and shaped for plunging into the poultry body 13 or parts thereof close to the breastbone 11 contrary to the transport direction T in each case between the inner fillet 14a and the outer fillet 14b. The centring fingers 42, 43 can, for example, be arranged on adjusting arms 46, 47 fixedly but releasably and preferably also adjustably in terms of their position and orientation. The adjusting arms 46, 47 are mounted so as to be pivotable about the pivot axes S. In particular in FIG. 7 it can be seen what it means when the centring fingers 42, 43 plunge in on either side next to the breastbone 11 between the inner fillet 14a and the outer fillet 14b. When seen contrary to the transport direction T, the centring fingers 42, 43 preferably enter the poultry body 13 beneath the inner fillets 14a, thereby displacing the outer fillet 14b at least partially. The centring fingers 42, 43 can, however, also be spatula-shaped or cylindrically shaped centring bodies.

The centring elements 33, 34 are preferably configured and mounted on the knife rocker element 35 so as to be deflectable at least in their centring position against a spring force by means of a spring element 48, 49. In other words, the centring elements 33, 34 are arranged on the knife rocker element 35 so as to be pretensioned by the spring elements 48, 49. The centring elements 33, 34 can be pivoted outwards against the spring force by the poultry body 13 or parts thereof. Preferably, the centring elements 33, 34, in the above-mentioned example the adjusting arms 46, 47, are mounted on the knife rocker element 35 so as to be pivotable about the pivot axes F, wherein the pivoting movements about the pivot axes S on the one hand and about the pivot axes F on the other hand can also be superposed. The above-mentioned pivot movements can moreover also be superposed with the pivoting movement of the knife rocker element 35 about the pivot axis M. The pivot axes F are oriented substantially parallel to the transport direction T in the centring position of the centring elements 33, 34.

Optionally, the centring elements 33, 34, on pivoting about the pivot axis S out of the stand-by position into the centring position, have a main movement component contrary to the transport direction T and, on pivoting out of the centring position into the stand-by position, have a main movement component in the transport direction T. More specifically, at least the free ends 44, 45 of the centring fingers 42, 43 carry out the mentioned movements, in order to be able to enter and move out of the poultry body 13 as parallel as possible to the breastbone 11. The centring elements 33, 34 are preferably controlled such that the centring elements 33, 34 are already in the centring position when the poultry bodies 13 or parts thereof come into the effective range of the centring elements 33, 34.

Preferably, the centring elements 33, 34 in the centring position are so situated relative to one another and are so positioned that the centring elements 33, 34, starting from their free ends 44, 45, run towards one another with their mutually facing inner sides in the transport direction T to a minimum distance B greater than zero, in order to "catch" the breastbone 11 or a breastbone crest process 27 of the breastbone 11, wherein the minimum distance B between the centring elements 33, 34 in the centring position is smaller than the gap A between the separating knives 21, 22, in order to guide the breastbone 11 centrally between the separating knives 21, 22.

The size of the gap A between the separating knives 21, 22 is configured to be fixed but adjustable and is preferably between 6 and 8 millimetres, and the size of the minimum distance B between the centring elements 33, 34 in the centring position is fixed but adjustable and is preferably 5 millimetres. The distances are also adjustable in other size ranges, for example in dependence on the size of the poultry bodies 13 to be processed. Preferably, the minimum distance B is in principle smaller than the size of the gap A.

The separating knives 21, 22 can be, for example, simple blades or the like. Preferably, the separating knives 21, 22 according to the illustrated embodiments are rotatingly drivable circular knives which are arranged spaced apart from one another to form a gap A which serves to receive the breastbone 11. The circular knives can be driven via a common drive or separate drive means. The direction of rotation, or drive direction, of the circular knives can vary. Preferably, the circular knives are driven contrary to the transport direction T of the poultry bodies 13 or parts. However, concurrent drive in the transport direction T is also possible. The or each drive means is optionally also connected to the control and/or regulating device.

As already described hereinbefore, the apparatus 10 is configured and adapted for cutting breast fillets 14 on poultry bodies 13 or parts thereof. These include, for example, also front halves of poultry bodies. Particularly preferably, however, the apparatus 10 is configured and adapted for cutting breast fillets 14 on breast caps 23 as part of a poultry body 13.

The method will be explained in greater detail hereinbelow with reference to the drawing.

The method serves and is suitable for cutting into breast fillets 14 that are connected to one another at least in the region of a breastbone 11 of a carcass 12 of poultry bodies 13 or parts thereof, the breast fillets being cut into along the breastbone. This may be, for example, cuts along the breastbone 11, in order to completely separate the breast fillets 14 individually from the carcass 12 fully automatically or semi-automatically, when the breast fillets 14 are already pre-loosened and hang down from the carcass 12 at least in part, in that the last remaining connecting web between the two breast fillets 14 is cut along the breastbone crest 26, or for cutting, along the breastbone 11, the breast fillets 14 which are still completely connected to the carcass 12 in order subsequently to pull the breast fillets 14, for example manually, from the carcass 12.

For cutting the poultry bodies 13 or parts thereof, the poultry bodies 13 or parts thereof to be processed are transported neck (appendage) 29 first in a transport direction T along a transport path defining a transport plane E, wherein the poultry bodies 13 or parts thereof are transported by means of a revolving driven transport conveyor 18 along the transport path to and through at least one knife assembly 20. The poultry body 13 or parts thereof, for example a front half or a breast cap, is threaded with the breastbone 11 of the carcass 12 between a pair of separating knives 21, 22 of the knife assembly 20. By further transport of the poultry bodies 13 or parts thereof along the transport path, the separating knives 21, 22 come into engagement with the breast fillets 14 and cut the breast fillets 14 on either side of the breastbone 11 along the breastbone 11. The breast fillets 14 are thereby either separated completely from the carcass 12 or loosened from the carcass 12 at least in the region of the breastbone 11, in order subsequently to pull them off automatically or manually.

This method is distinguished according to the invention in that the breastbone 11, before the separating knives 21, 22 engage into the breast fillets 14, is pre-centred by means of a centring means 32 in that centring elements 33, 34 of the centring means 32 are moved from both sides of the transport path out of a stand-by position outside the transport path into a centring position on the transport path, and in that the centring elements 33, 34 are moved back into the stand-by position as soon as a breastbone crest process 27 of the breastbone 11 of the carcass 12 is situated between the separating knives. In other words, the breastbone 11 is "caught" by means of the centring elements 33, 34 and is transferred in a centred manner to or between the separating knives 21, 22. As soon as the leading tip of the breastbone crest 26 is securely situated between the separating knives 21, 22, the centring elements 33, 34 are pivoted back in order to free the path/transport path again.

Preferably, saddling of the poultry bodies 13 or parts thereof takes place in the region of an upper run 16 of the transport conveyor 18, while cutting takes place in the region of a lower run 17 of the transport conveyor 18. Cutting, or the cut that is made, can be the final cut, for example in the case of (fully) automatic separation in a breast cap filleting machine. However, the cut can also be the initial cut, in that the breast fillets 14 are only detached from the carcass 12 in the region of the breastbone 11, in order subsequently to pull the breast fillets 14 from the carcass manually, for example in the case of a semi-automatic breast cap filleting machine.

Centring of the poultry bodies 13 or parts thereof takes place in that centring fingers 42, 43 as the centring elements 33, 34 plunge in with their free ends 44, 45, on pivoting about pivot axes S out of the stand-by position into the centring position, on either side of the transport path into the poultry body 13 or parts thereof close to the breastbone 11 in each case between the inner fillet 14a and the outer fillet 14b and thereby centre the breastbone 11 before it enters between the separating knives 21, 22. Pivoting of the centring elements 33, 34 out of the stand-by position into the centring position thereby takes place with a resulting main movement component contrary to the transport direction T, and movement out of the centring position into the stand-by position takes place with a resulting main movement component in the transport direction T.

Pivoting about the pivot axis S can be a flowing movement. Preferably, the poultry bodies 13 or parts thereof transported in the transport direction T meet centring elements 33, 34 which have already been moved out of the stand-by position into the centring position and are then stationary. In coordination with the transport speed of the poultry bodies 13 or parts thereof and/or with the determined size of the poultry bodies 13 or parts thereof to be processed and/or with other boundary conditions, pivoting preferably takes place via a control and/or regulating device. Ideally, the centring elements 33, 34 are thus already pivoted into the centring position before the poultry bodies 13 or parts thereof reach the position of the centring elements 33, 34, so that the centring elements 33, 34 enter the poultry bodies 13 or parts thereof almost linearly, in a straight line along the breastbone 11. On pivoting out of the centring position back into the stand-by position, the centring elements 33, 34 are accelerated in the transport direction T at least temporarily to a speed that is greater than the transport speed of the transport conveyor 18. The centring elements 33, 34 are thus moved in the transport direction T more quickly than the poultry body 13 or parts thereof, so that the centring elements 33, 34 are moved out of the poultry body 13 or parts thereof and back into the stand-by position without damaging or tearing into the breast fillets 14.

Particularly preferably, the method is carried out with an apparatus as has been described hereinbefore in different embodiments.

The invention claimed is:

1. An apparatus configured and adapted for cutting into breast fillets that are connected to one another at least in the region of a breastbone of a carcass of poultry bodies or parts thereof, the breast fillets being cut into along the breastbone, the apparatus comprising:
    a transport apparatus having a revolvingly driveable transport conveyor for transporting, neck first, the poultry bodies or parts thereof to be processed in a transport direction along a transport path defining a transport plane;
    at least one holding apparatus, arranged on the transport conveyor, for receiving and holding the poultry bodies or parts thereof during transport along the transport path in the transport plane;
    a knife assembly, arranged along the transport path in a region of the transport conveyor, the knife assembly having a pair of separating knives for cutting the breast fillets along the breastbone, wherein one of the separating knives is arranged on either side of a center axis of the transport path such that there is formed between the pair of separating knives a gap for transport of the poultry bodies or parts thereof to be processed with the breastbone through the separating knives, which are mutually opposite; and
    a centring means is associated with the knife assembly, the centring means being configured and adapted for pre-centring the breastbone of the carcass, the centring means comprising two centring elements which are each movable out of a stand-by position, in which the centring elements are positioned outside the transport path, into a centring position, in which the centring elements are positioned on the transport path, and back, wherein the centring elements in their centring position are located at least partly in front of the pair of separating knives in the transport direction of the poultry bodies or parts thereof.

2. The apparatus according to claim 1, wherein the transport conveyor has an upper run and a lower run, the knife assembly being arranged in a region of the lower run.

3. The apparatus according to claim 1, wherein the knife assembly with the centring means is arranged on a knife rocker element which is movable up and down relative to the transport path.

4. The apparatus according to claim 3, wherein the centring elements, at least in their centring position, are configured and mounted on the knife rocker element so as to be deflectable by means of a spring element against a spring force.

5. The apparatus according to claim 4, wherein the centring elements are each pivotable by means of the spring element about a pivot axis, wherein the pivot axes, in the centring position, are oriented substantially parallel to the transport direction.

6. The apparatus according to claim 1, further comprising a pneumatic cylinder associated with each centring element, the pneumatic cylinder being configured and adapted for carrying out a pivoting movement of the centring elements about a pivot axis.

7. The apparatus according to claim 6, wherein the pivot axes of the centring elements are oriented perpendicularly to the transport plane spanned by the transport path.

8. The apparatus according to claim 6, wherein the pneumatic cylinders are connected to a control and/or regulating device for control of the pivoting movement of the centring elements about the pivot axis.

9. The apparatus according to claim 1, wherein the centring elements are centring fingers without cutting edges, the centring fingers having free ends configured and shaped to plunge into the poultry body or parts thereof close to the breastbone in a direction contrary to the transport direction in each case between an inner fillet and an outer fillet of the breast fillet.

10. The apparatus according to claim 1, wherein:
    the movement of the centring elements is a pivoting about a pivot axis;
    on pivoting out of the stand-by position into the centring position, the pivoting having a main movement component contrary to the transport direction; and
    on pivoting out of the centring position into the stand-by position, the pivoting having a main movement component in the transport direction.

11. The apparatus according to claim 1, wherein the centring elements in the centring position are so situated relative to one another and are so positioned that the centring elements, starting from free ends thereof, run towards one another with mutually facing inner sides in the transport direction to a minimum distance greater than zero, in order to "catch" the breastbone or a breastbone crest process of the breastbone, the minimum distance between the centring elements in the centring position being smaller than the gap between the separating knives, in order to guide the breastbone centrally between the separating knives.

12. The apparatus according to claim 11, wherein:
   a size of the gap between the separating knives is configured to be fixed but adjustable; and
   a size of the minimum distance between the centring elements in the centring position is fixed but adjustable.

13. The apparatus according to claim 1, wherein the separating knives are rotatingly driven circular knives which are arranged spaced apart from one another to form the gap which serves to receive the breastbone.

14. The apparatus according to claim 13, wherein the circular knives are driven contrary to the transport direction of the poultry bodies or parts thereof.

15. The apparatus according to claim 1, wherein the apparatus is configured and adapted for cutting breast fillets on breast caps as part of a poultry body.

16. A method for cutting into breast fillets that are connected to one another at least in a region of a breastbone of a carcass of poultry bodies or parts thereof, the breast fillets being cut into along the breastbone, comprising the steps:
   transporting, neck first, the poultry bodies or parts thereof to be processed in a transport direction along a transport path defining a transport plane, wherein the poultry bodies or parts thereof are transported by a revolvingly driven transport conveyor along the transport path to and through at least one knife assembly;
   threading the breastbone of the carcass between a pair of separating knives of the knife assembly; and
   cutting the breast fillets on either side of the breastbone along the breastbone using the separating knives;
   wherein the breastbone, before the separating knives engage into the breast fillets, is pre-centred by a centring means, centring elements of the centring means being moved from both sides of the transport path out of a stand-by position outside the transport path into a centring position on the transport path, and the centring elements being moved back into the stand-by position as soon as a breastbone crest process of the breastbone of the carcass is situated between the separating knives.

17. The method according to claim 16, wherein the centring elements comprise centring fingers that plunge in with free ends, on pivoting about pivot axes, out of the stand-by position into the centring position, on either side of the transport path into the poultry body or parts thereof close to the breastbone in each case between an inner fillet and an outer fillet and thereby centre the breastbone before it enters between the separating knives.

18. The method according to claim 16, wherein the movement of the centring elements out of the stand-by position into the centring position takes place with a resulting main movement component contrary to the transport direction, and the movement out of the centring position into the stand-by position takes place with a resulting main movement component in the transport direction.

19. The method according to claim 16, wherein the poultry bodies or parts thereof transported in the transport direction meet the centring elements which have already been moved out of the stand-by position into the centring position and are then stationary.

20. The method according to claim 16, wherein the centring elements, at least on moving out of the centring position into the stand-by position, are accelerated at least temporarily to a speed that is greater than a transport speed of the transport conveyor.

21. The method according to claim 16, wherein the method is carried out with an apparatus comprising:
   a transport apparatus having a revolvingly driveable transport conveyor for transporting, neck first, the poultry bodies or parts thereof to be processed in a transport direction along a transport path defining a transport plane;
   at least one holding apparatus, arranged on the transport conveyor, for receiving and holding the poultry bodies or parts thereof during transport along the transport path in the transport plane;
   a knife assembly, arranged along the transport path in a region of the transport conveyor, the knife assembly having a pair of separating knives for cutting the breast fillets along the breastbone, wherein one of the separating knives is arranged on either side of a center axis of the transport path such that there is formed between the pair of separating knives a gap for transport of the poultry bodies or parts thereof to be processed with the breastbone through the separating knives, which are mutually opposite; and
   a centring means is associated with the knife assembly, the centring means being configured and adapted for pre-centring the breastbone of the carcass, the centring means comprising two centring elements which are each movable out of a stand-by position, in which the centring elements are positioned outside the transport path, into a centring position, in which the centring elements are positioned on the transport path, and back, wherein the centring elements in their centring position are located at least partly in front of the pair of separating knives in the transport direction of the poultry bodies or parts thereof.

* * * * *